United States Patent [19]
Thomas et al.

[11] Patent Number: 5,311,838
[45] Date of Patent: May 17, 1994

[54] METHOD AND MEANS FOR FEEDING ANIMALS

[75] Inventors: Richard J. Thomas, Eddyville; Larry L. Coleman, Broken Bow, both of Nebr.

[73] Assignee: GroMaster, Inc., Omaha, Nebr.

[21] Appl. No.: 8,548

[22] Filed: Jan. 26, 1993

Related U.S. Application Data

[63] Continuation-in-part of Ser. No. 869,226, Apr. 14, 1992, Pat. No. 5,255,632.

[51] Int. Cl.⁵ .............................................. A01K 5/02
[52] U.S. Cl. .................................. 119/51.5; 119/53.5; 119/72
[58] Field of Search ................. 119/51.5, 53, 53.5, 119/54, 72

[56] References Cited

U.S. PATENT DOCUMENTS

| | | | |
|---|---|---|---|
| 1,282,092 | 10/1918 | Lieber | 119/53.5 |
| 2,543,916 | 3/1951 | Lewis | 119/53.5 |
| 3,023,770 | 3/1962 | Godshalk | 137/391 |
| 3,233,590 | 2/1966 | Venca | 119/51.5 |
| 3,441,004 | 4/1969 | Henke | 119/72 |
| 3,547,081 | 12/1970 | Geerlings | 119/51.5 |
| 3,765,644 | 10/1973 | Zeuner | 251/129 |
| 3,798,401 | 3/1974 | Kochanski et al. | 200/84 C |
| 3,829,060 | 8/1974 | von Lewis | 251/129 |
| 4,051,812 | 10/1977 | DeLoach et al. | 119/51.5 |
| 4,182,273 | 1/1980 | Peterson | 119/51.5 |
| 4,216,742 | 8/1980 | Kirchhofer | 119/53 |
| 4,252,083 | 2/1981 | Gilst et al. | 119/51.11 |
| 4,491,146 | 1/1985 | Sveds | 137/341 |
| 4,612,949 | 9/1986 | Henson | 137/2 |
| 4,660,508 | 4/1987 | Kleinsasser et al. | 119/51.5 |
| 4,743,717 | 5/1988 | Petersen | 200/84 C |
| 4,744,808 | 5/1988 | Treu | 55/165 |
| 4,790,266 | 12/1988 | Kleinsasser et al. | 119/51.5 |
| 4,889,078 | 12/1989 | Smiley | 119/51.5 |
| 5,010,849 | 4/1991 | Kleinsasser et al. | 119/53 |
| 5,026,954 | 6/1991 | Cebulski | 200/84 C |
| 5,097,797 | 3/1992 | Van Zee et al. | 119/57.4 |

FOREIGN PATENT DOCUMENTS

| | | | |
|---|---|---|---|
| 185034 | 8/1922 | United Kingdom | 119/53 |
| 756072 | 8/1956 | United Kingdom | 119/53 |

*Primary Examiner*—Gene Mancene
*Assistant Examiner*—Todd E. Manahan
*Attorney, Agent, or Firm*—Zarley, McKee, Thomte

[57] ABSTRACT

An animal feeder comprising a circular trough having a raised platform at its center which is positioned directly below the lower end of a vertically disposed feed supply tube. The raised platform includes a first inclined wall which terminates in a substantially vertically disclosed wall portion having a second inclined wall extending downwardly and outwardly from the lower end thereof. A U-shaped water receiving portion is provided at the lower end of the second inclined wall and has an outer side wall extending upwardly therefrom. A moisture sensor is mounted on the second inclined wall above the U-shaped water receiving portion to halt the flow of water to a water nozzle mounted on the second inclined wall, when moisture comes into contact with the moisture sensor. Divider panels are secured to the trough and the feed supply tube to define eating spaces and to import movement to the feed supply tube to prevent bridging of the feed. The movement of the divider panels is caused by the animals coming into contact therewith. The method by which the animals are fed is also disclosed.

35 Claims, 3 Drawing Sheets

METHOD AND MEANS FOR FEEDING ANIMALS

CROSS REFERENCE TO RELATED APPLICATION

This is a continuation-in-part application of application Ser. No. 07/869,226 entitled "DRINKING WATER CONTROL FOR ANIMAL FEEDERS," filed Apr. 14, 1992, now U.S. Pat. No. 5,255,632.

BACKGROUND OF THE INVENTION

1. Field of the Invention

This invention relates to an animal feeder and more particularly to a wet/dry animal feeder having means for controlling the supply of water thereto.

2. Background Information

Many types of animal feeders have been previously provided and are generally considered to be dry feeders, wet feeders, or wet/dry feeders.

U.S. Pat. No. 4,401,057 (VanGlist) discloses a circular feeder which has an inclined inner surface and a vertical side wall of the trough which converge and join at a flat annular base of the trough. Feed is dumped from a central supply duct to the top of the rear surface but falls directed therefrom into the base portion of the trough. Water is supplied to the feeder also at drinking nipples positioned at a height above the trough, in which case some water may dribble from the drinking action of the animal into the trough to wetten the feed in the trough.

U.S. Pat. No. 4,481,907 (Blicher) discloses a trough which has both water and feed deposited onto an upper part of an inclined surface and the animal can satisfy its rooting instinct by moving the feed material and water across the inclined surface which has a shallow curved step. The surface is divided into separate sections by vertical divider plates which are fixed relative to the trough. The feed and water is supplied through vertical tubes and it is stated that the materials are dispensed slowly at a constant rate while the animal is feeding.

U.S. Pat. No. 4,182,273 (Peterson) discloses a feeder which has an annular trough surrounding a cylindrical drum, on the top of which is received dry feed from a hopper. The trough is filled with water to a level measured by a sensing device. Feed from the top of the drum is deposited into the trough by a sweeping action caused by a rotation of the water supply pipe. The trough is a flat bottom trough. The animal is not allowed to access the material on the top of the drum since it is shielded by a sleeve shaped shroud.

U.S. Pat. No. 4,051,812 (Deloach) discloses a feeder having a trough into which dry feed and water is dispensed with the level of water being detected by a pair of electrodes attached to the surface of the trough.

Canadian Patent No. 471,126 (Grindstaff) discloses a feeder for rabbits which includes a circular trough having a flat base and a vertical side wall on which is mounted a guide tube for dispensing the feed into the trough centrally of the trough. The guide tube is mounted on the side wall of the trough by a plurality of radially extending divider plates.

Prior to the availability of the hog feeder described in U.S Pat. No. 4,660,508, issued Apr. 28, 1987, pigs were generally fed dry feed in a trough and were separately supplied with water at a location remote from the trough. In the '508 feeder, a feed shelf is positioned above a trough having water nipples positioned adjacent thereto. In the '508 feeder, the pig may either eat dry feed from the shelf or may brush the feed from the shelf into the trough so as to be able to mix the feed with water.

Although the feeder of the '508 patent has met with considerable success, it has been found that in some situations, it is desirable to have the feed closer to the supply of water, especially for young pigs. It has also been found that it is highly desirable to provide a hog feeder wherein the animal may feed on wet and dry materials on a continuously inclined surface with the dry materials being fed at the top of the surface. Water is supplied to a trough at the bottom of the inclined surface so that the animal is able to move the feed from the top of the inclined surface to the trough to provide wetting of the feed material.

SUMMARY OF INVENTION

An animal feeder is described which comprises a circular trough having a raised platform or feed receiving portion at its center with an inclined inner side wall portion extending downwardly and outwardly from the periphery of the raised platform portion. The trough also includes an upturned outer wall portion at the outer end of the inner side wall portion. An arcuate water receiving portion is provided between the lower end of the inclined inner side wall portion and the upturned outer wall portion. At least one water discharge nozzle is mounted on the inclined inner side wall portion above the lower end thereof for supplying water to the arcuate water receiving portion of the trough. The water discharge nozzle is operatively connected to a source of water having an electrical valve associated therewith for controlling the supply of water thereto.

An electrical moisture sensing switch or electrode is positioned on the inclined inner side wall portion adjacent the lower end thereof for sensing the presence of water or wet feed thereon. The moisture sensing switch is operatively electrically connected to the valve for closing the valve when the switch senses the presence of moisture in contact therewith.

A vertically disposed hollow feed supply tube or hopper is positioned above the raised platform portion and has its lower end spaced therefrom to define a feed opening therebetween whereby feed in the feed supply tube will be deposited on the raised platform portion and a portion of the upper end of the inclined inner side wall portion of the trough for access to the animal. A plurality of upstanding panels are operatively connected to the trough and to the feed supply tube to define individual eating spaces around the trough. If an animal comes into contact with one of the panels, the contact causes the feed supply tube to be moved slightly with respect to the raised platform portion to prevent bridging of the feed in the opening between the lower end of the feed supply tube and the raised platform portion.

The method of the operation of the feeder is also described wherein wet and dry materials are available to the animal. The feed is deposited on the upper end of the continuously sloped inclined inner wall portion so that the dry materials are available to the animal at the top of the surface. Water is present in the trough at the bottom end of the inclined surface so that the animal is able to move feed from the top of the inclined surface to the trough to provide wetting of the material.

It is therefore a principal object of the invention to provide an improved animal feeder.

It is yet a further object of the invention to provide an improved hog feeder.

Yet another object of the invention is to provide a method of feeding wet and dry materials in a hog feeder on a continuously inclined surface so that dry feed is available at the top of the inclined surface with the water being supplied to a trough at the bottom of the inclined surface so that the animal is able to move the feed from the top of the inclined surface to the trough to wet the feed material.

Still another object of the invention is to provide a wet and dry type feeder having a feed receiving surface and a water trough in which the trough is substantially V-shaped and the water level in the trough is controlled so as to significantly reduce the amount of water contained within the trough in comparison with a flat bottom trough of the prior art.

Still another object of the invention is to provide a wet and dry feeder which is especially well-suited for use in situations where a high milk and high fat feed is being fed to the animals, such as small pigs.

Still another object of the invention is to provide a wet and dry feeder including a plurality of upstanding panels which not only divide the trough into individual feeding spaces but which are also operatively connected to a central feed hopper so that contact of the animal with the panel will slightly move the feed hopper with respect to the trough to prevent bridging of feed in the feed dispensing opening.

Still another object of the invention is to provide a wet and dry feeder including means for finitely controlling the level of water within the trough.

Still another object of the invention is to provide a wet and dry animal feeder which includes means for sensing the water level in the trough or the presence of high moisture feed in the trough so that the supply of water to the trough will be discontinued.

Still another object of the invention is to provide a wet and dry feeder which is especially well-suited for use with young pigs which normally require a high milk and high fat feed.

Still another object of the invention is to provide a wet and dry animal feeder wherein the feed is available to the animal on an inclined surface and wherein a water supply is closely positioned to the available feed that the animal will be encouraged to consume water or to mix the feed with the water.

These and other objects of the present invention will be apparent to those skilled in the art.

DESCRIPTION OF THE PREFERRED EMBODIMENT

Figure 4:
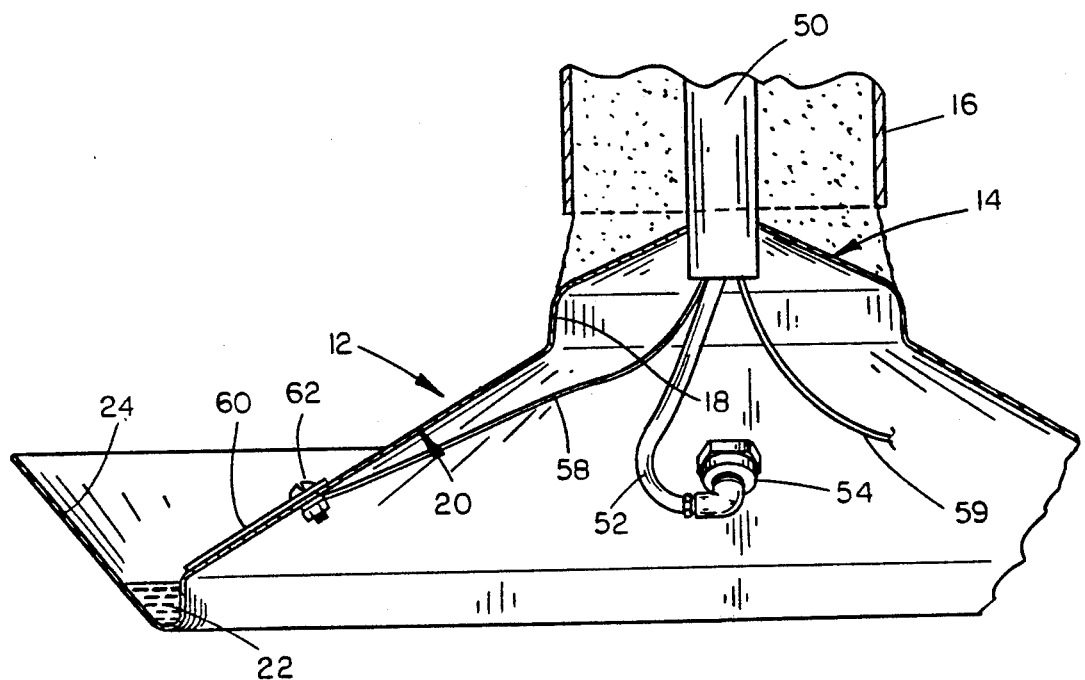
FIG. 4 is a partial vertical sectional view of the lower end of the feeder.

The feeder of this invention is referred to generally by the reference numeral 10. Feeder 10 includes a circular trough 12 having a centrally disposed raised platform portion or feed receiving portion 14 at the center thereof adapted to receive feed from the lower end of a feed supply tube or hopper 16. Preferably, raised platform portion 14 is inclined with respect to the horizontal although the same could be substantially horizontally disposed if desired. The outer end of raised platform portion 14 terminates in a substantially vertically disposed wall portion 18 which communicates with a continuously sloped inclined inner side wall 20. Inner side wall 20 is inclined with respect to the horizontal and terminates in a substantially U-shaped portion 22 which is adapted to receive and contain water therein as illustrated in FIG. 4. An outer wall 24 extends upwardly and outwardly from the U-shaped portion 22 as also best seen in FIG. 4. The inner wall 20 and the outer wall 24 thus form a trough which is generally V-shaped in cross-section converging to an apex at the base. The inner wall 20 turns downwardly at a position closely adjacent the apex so as to form the U-shaped portion 22. The outer wall 24 is inclined at a constant angle to its intersection with the apex at the base of the trough. This defines a narrow, U-shaped, annular channel at the base of the trough surrounding the inner wall 20 so as to restrict the amount of water contained within the trough to this very narrow channel. The volume of water is thus very much less than would be the case with a flat bottom feeder and reduces the likelihood of the animal playing in or with the water. The raised portion 14 has a conical upper surface which is thus inclined outwardly and downwardly from a central position thereof so that feed resting on the surface tends to flow outwardly to the vertical wall portion 18. The diameter of the outside edge of the upper conical surface is preferably slightly greater than the outside diameter of the feed tube 16 so that material tends to remain in position between the lower end of the feed tube and the outer edge. The angle of the conical surface is selected so that more slippery feed is not caused to slide outwardly and thus escape from the area at the bottom of the tube and thus fill the trough. The angle selected is thus a compromise between that required to maintain more slippery feed on the surface and that required for the high milk, high fat feeds which tend to be much stickier. However, the upper surface is inclined outwardly so that any moisture in the feed can run outwardly from the surface onto the vertical wall portion 18 and then into the lower part of the trough rather than collecting on the upper surface.

A plurality of floor supports 26 are secured to the outer wall 24 in a spaced-apart relationship and have an opening 28 formed therein adapted to receive a bolt or the like to facilitate the connection or attachment of the supports 26 to the supporting floor.

Figure 1:
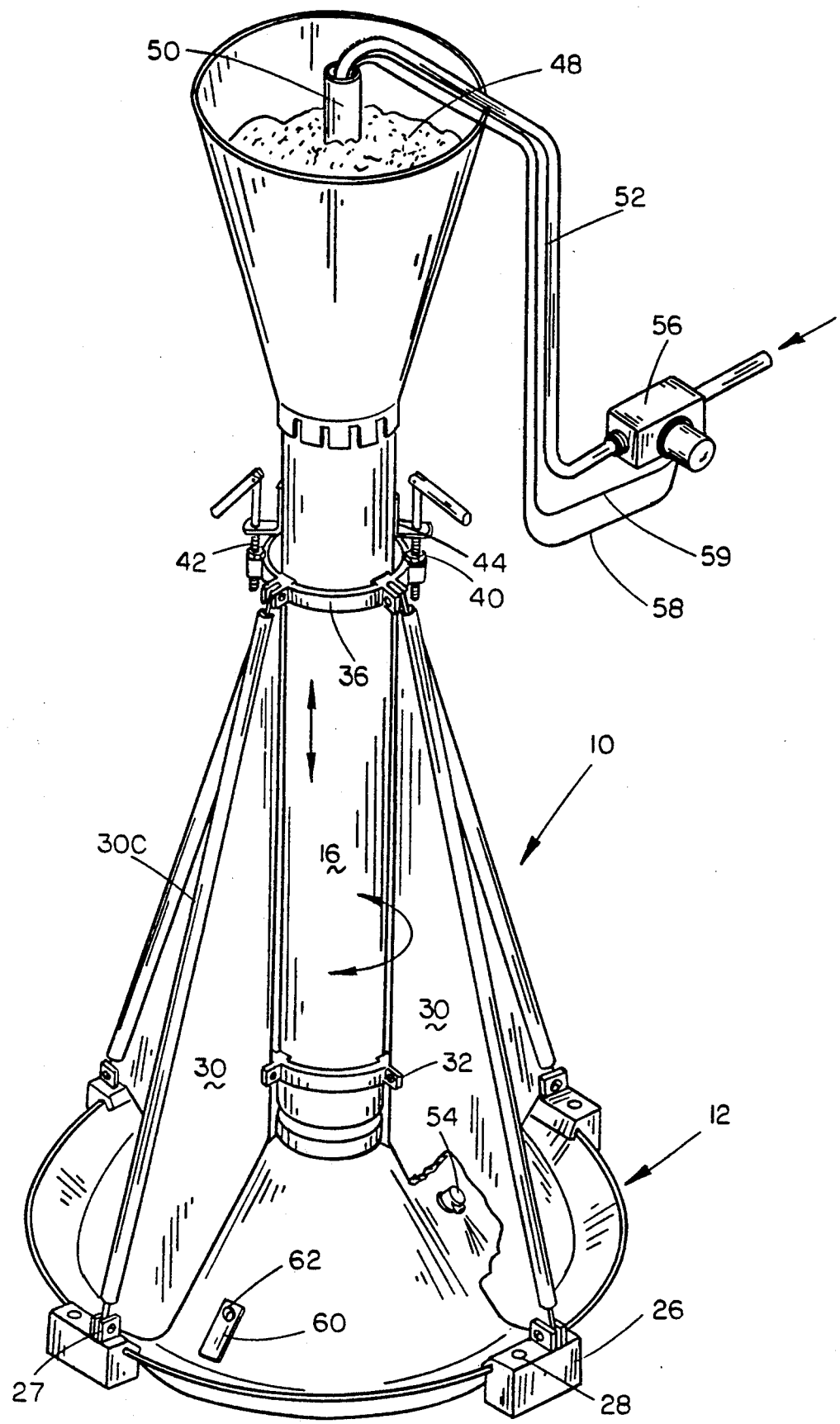
FIG. 1 is a perspective view of the feeder of this invention.
Figure 2:
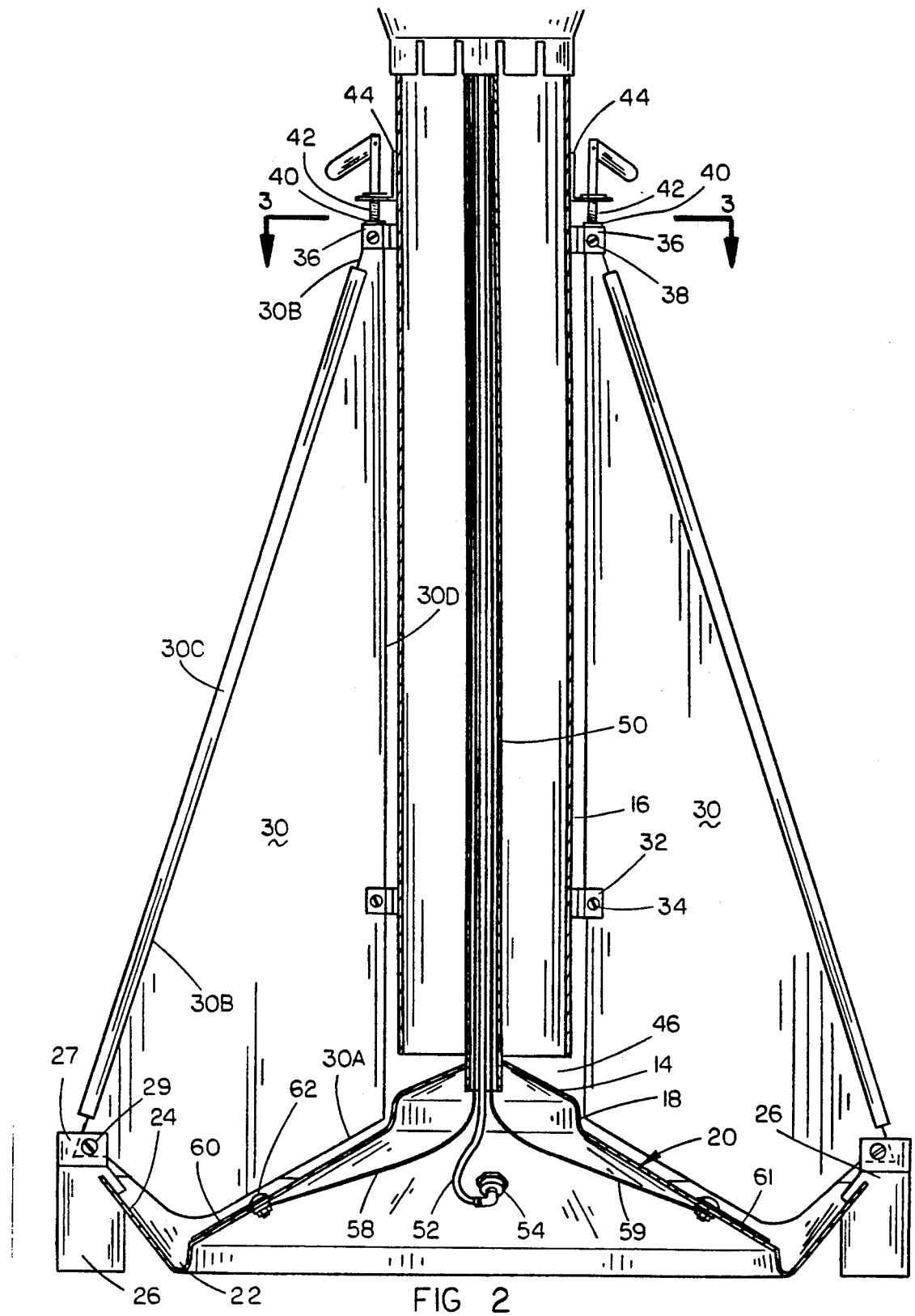
FIG. 2 is a partial vertical sectional view of the invention.
Figure 3:
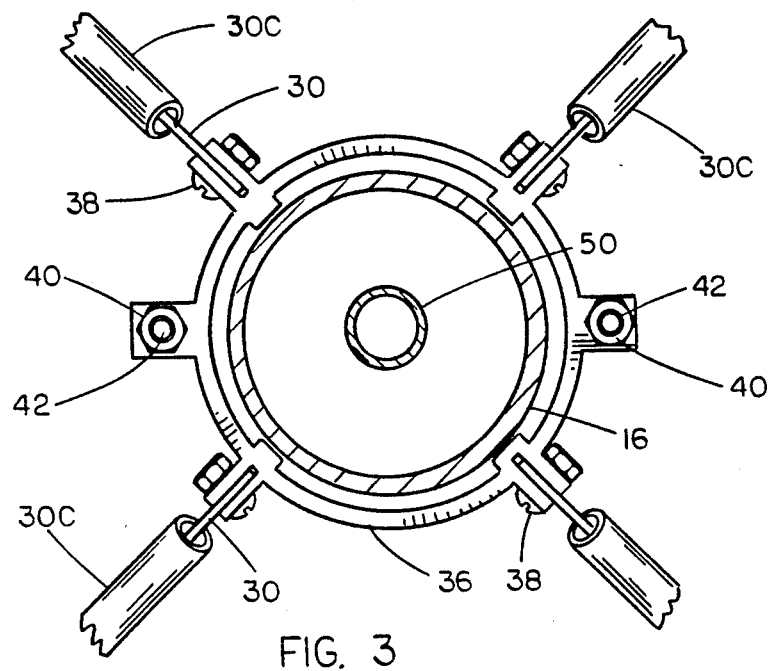
FIG. 3 is an enlarged sectional view as seen on lines 3—3 of FIG. 2.

As seen in the drawings, an upstanding divider panel 30 is secured to a pair of spaced-apart legs 27 on each of the supports 26 by bolt 29 and extends upwardly and inwardly therefrom to define a plurality of individual animal eating spaces therebetween. The lower inner ends of the panels 30 are connected to a ring-shaped member 32 by bolts or screws 34. Ring-shaped member 32 loosely embraces the lower end of feed supply tube 16 as seen in the drawings. The upper ends of each of the panels 30 are secured to ring-shaped member 36 by means of screws or bolts 38. Ring-shaped member 36 loosely embraces the upper end of feed supply tube 16 as best seen in FIGS. 1 and 2. A plurality of nuts 40 are secured to the ring-shaped member 36 which threadably receive the lower ends of threaded rods 42 which are operatively connected to brackets 44 secured to the exterior surface of feed supply tube 16. Thus, selective rotation of the threaded rods 42 with respect to the bracket 44 causes the tube 16 to be raised or lowered to change the size of the feed dispensing opening 46 which is defined by the lower end of the tube 16 and the upper surface of the raised platform portion 14.

Each panel 30 is generally triangular in shape as best shown in FIG. 2 and extends from a pair of legs 27 at the support 26 inwardly to define a lower edge 30A, and upwardly to define an outer edge 30B. The outer edge is inclined upwardly and inwardly toward the ring member 36 and includes a stiffening member 30C along the edge. An inner edge 30D extends vertically along the outside of the feed supply tube 16 and is connected thereto only by the ring members 32 and 36. The lower edge 30A follows generally the shape of the outer wall 24 and the inner wall 20 but does not contact either and does not extend into the U-shaped portion 24. The panel 30 is thus connected only to the foot support 26 and to the ring members 32 and 36 and is formed of a thin plastic material so as to allow some flexibility to allow movement of the ring member 32 and the supply tube 16 relative to the trough when the panel is knocked by an animal boisterously feeding at the trough. In addition, there is a small difference in diameter between the inside surface of the ring member 32 and the outside surface of the feed tube 16 so as to allow the necessary vertical adjustment movement and so as to allow some side-to-side movement of the tube 16 relative to the trough to prevent bridging of the feed.

Starter Feeds flow very poorly and bridge easily due to a high milk and fat content. The dividers 30 play an important role in enhancing the flowability and decreasing the plugging of the opening with more difficult Starter Feed. The dividers 30 are bumped continuously by the pigs both in their eating action and while jostling for position at the feeder. This bumping causes turning or twisting action on the center feed hopper and tube which is suspended from and fastened to the dividers. This action agitates the lowermost feed in the hopper. This is made possible because the hopper and feed tube being suspended from the outer edge of the trough by the dividers which are made of a flexible material.

The upper end of feed supply tube 16 is in operative communication with the source of feed to deliver the feed 48 thereto. A hollow tube 50 is disposed within the interior of tube 16 and has its lower end extending through the raised platform portion as best seen in FIG. 2. A water supply tube 52 extends downwardly through the tube 50 and is operatively connected to one or more water discharge nozzles 54 which are mounted on the inner side wall 20 and which are designed to direct water downwardly into the U-shaped portion 22. Tube 52 is in fluid communication with the solenoid actuated valve 56. Preferably, a pair of diametrically opposing and spaced-apart nozzles 54 are utilized.

A pair of electrical leads 58 and 59 also extend downwardly through the tube 50 and are electrically connected respectively to electrodes 60 and 61, forming a moisture sensing switch, which are secured to the inner side wall 20 by means of screws or bolts 62. Preferably, each of the electrodes 60 and 61 are in the form of an elongate flat metal plate having its longitudinal axis disposed parallel to the radial axis of inner side wall 20. Preferably, the lower end of the electrodes 60 and 61 is disposed just above the upper end of the U-shaped portion 22 as best illustrated at FIG. 2. Electrical leads 58 and 59 are operatively connected to the solenoid operated valve 56 and cooperate with the electrodes to form a switch designed to close the valve 56 when water comes into contact with the lower end of the electrodes allowing communication of current therebetween. The switch is also designed to close the valve 56 when sufficiently moist feed comes into contact therewith. The electrodes 60 and 61 are arranged at diametrically opposed positions around the annular trough so that water can flow in either direction to complete a water filled channel between the electrodes to communicate current. This reduces the possibility of damming of the channel by moist feed.

Thus, water will be supplied to the discharge nozzle 54 by means of the tube 52 to keep the U-shaped portion 22 filled with water as illustrated in FIG. 4. When the water level in U-shaped portion 22 reaches the lower end of the electrodes 60 and 61 the switch closes the valve 56. Similarly, when sufficently moist feed is in contact with the electrodes 60 and 61 valve 56 will be closed. The hollow tube 50 is fixed in the feed tube 16 by its engagement with the raised portion 14 and thus prevents the movement of the feed downwardly in the tube 16 from dragging the flexible tube 52 and the connector wires 58 and 59 downwardly.

In operation, the feed 48 will be supplied to the upper end of the feed supply tube 16 and the feed will pass downwardly therethrough and will come into contact with the raised platform portion 14 and the upper end of the inner wall 20 as best seen in FIG. 4. The angle of the raised platform portion 14 and the inner wall 20 relative to the repose angle of the feed is such that the feed will generally rest upon the trough as illustrated in FIG. 4. The valve 56 will have previously supplied water to the discharge nozzle 54 so that water will be present in the U-shaped portion 22. Thus, a small pig may either eat the feed at the upper end of the inner wall 20 in a dry condition or can brush the feed downwardly into the U-shaped portion 22 as desired to consume wet feed. If the pig desires to only eat the feed in a dry condition, the water is very close to the dry feeding location so that the pig may easily gain access to water for drinking if the pig so desires.

The lower end of the tube 16 is vertically adjustable as previously described to enable the feed access opening 46 to be varied depending upon the consistency of the feed. Although many circular animal feeders have been previously provided, it is believed that the unique relationship between the raised platform portion, inner wall 20 and U-shaped portion 22 is such that unique advantages are obtained over that described in the prior art. It is not believed that any of the prior art devices enables a pig to eat the dry feed at the feed access opening 46 and on the upper end of a continuously sloped surface and then consume water in the U-shaped portion 22 or in the alternative, to brush the feed from the feed access opening 46 downwardly into the U-shaped portion 22 so that the feed becomes mixed with water.

Another unique feature of the invention is that the panels 30 due to their connection with the ring-shaped member 32, ensures that the feed will not become clogged or bridged in the feed access opening 46. Movement of the panels 30 by the animals during the feeding operation tends to shake or move the lower end of the feed supply tube 16 relative to the trough 12 so that clogging or bridging will not occur in the feed access opening 46.

The feeder described above is particularly designed for use as a nursery feeder for small pigs immediately after weaning. However, some aspects of the feeder may be usable in other types of feeders for larger animals. For the nursery piglets, the design of the feeder including the inclined rear surface of the trough allows the relatively small animal to have access to the dry feed at the top of the surface and the wetted feed at the bottom of the surface at the same location as the shallow V-shaped groove within which the water is contained. The animal can therefore readily access all of these areas without the necessity for reaching up to a height beyond which it is comfortable. The small amount of water contained within the V-shaped groove reduces the tendency of the animal to play in the water which would otherwise interfere with the proper feeding process.

In one alternative arrangement (not shown) the U-shaped cup at the bottom apex of the trough can be omitted and the base of the trough thus formed simply by the V-shaped intersection between the inner wall 20 and the outer wall 24.

In a further alternative, the height of the feeder can be reduced by providing the hopper section on the feed tube at a position commencing between the ring member 32 and the ring member 36. This requires therefore the ring member 36 to be of increased diameter to surround the hopper and, of course, requires a modification to the shaping of the inside edge of the panels forming the dividers. However, there is still a possibility for the movement of the lower edge of the feed duct to occur relative to the trough due to the flexing of the panels and the couplings between the different elements. This reduced height provides a feeder which is more stable to prevent toppling and requires a reduced amount of materials for the manufacture.

In a further alternative arrangement (not shown) the trough, including the foot supports, is formed at an injection molded part rather than of the fabricated construction shown in the drawings. This enables the manufacture of the base portion of the feeder at a reduced cost with more structural stability.

In a yet further alternative arrangement (not shown), the feeder can be manufactured as a two sided feeder rather than in the circular form shown. In such a construction, the trough has two distinct sides each of which is arranged on a respective side of the feeder. The inner surface 20 is then formed as a simple flat surface inclined from an elongate upper surface portion 14 downwardly toward a straight base of the trough. The hopper is then elongate and deposits along the full length of the top surface. The advantageous arrangement of the inclined inner surface 20 and shallow V-shaped groove for receiving the water is used therefore in a two sided feeder. The two sided feeder has the advantage that it can be used in a fence line to serve two pens of animals thus enabling a single feeder to do the job of two of the circular feeders of the type shown in the drawings.

Thus it can be seen that the invention accomplishes at least all of its stated objectives.

We claim:

1. A feeder for animals comprising a trough having a front surface adjacent to an animal feed position, a rear surface spaced from the animal feed position, a base between the front and rear surfaces, the front and rear surfaces each including at least a portion thereof adjacent the base which is inclined to the horizontal so as to define in cross section at the base a substantially V-shape of the trough with the portions converging substantially to an apex at the base between the portions, a hopper for containing feed, surface means located beneath the hopper onto which feed falls from the hopper, the surface means being arranged such that the animal at the animal feed position can reach the surface means to take the feed therefrom and such that feed caused by the animal to fall from the surface means falls into the trough, supply means for supplying water into the trough and means for detecting a level of the water in the trough and for actuating said supply means in response to a reduction in the level of water to maintain the level of water at a predetermined height within said substantially V-shape of the trough, said trough including a U-shaped cup at the base thereof defining said substantially V-shape, upper edges of the U-shaped cub being connected to said front and rear surfaces respectively.

2. The feeder according to claim 1 wherein the detecting means comprises an electrode mounted on the rear surface immediately adjacent the U-shaped cup.

3. The feeder according to claim 1 wherein the trough is annular such that the rear surface is substantially frusto conical and such that the front surface surrounds the rear surface as an annular rim surface.

4. The feeder according to claim 1 wherein the surface means comprises an upper portion of the rear surface.

5. An animal feeder comprising,
   a circular trough having a raised platform portion at its center, an inner side wall portion extending downwardly and outwardly from the periphery of said raised platform portion, and an upturned outer wall portion at the outer end of said inner side wall portion.
   a water discharge means positioned in said trough for supplying water thereto,
   electrical valve means connecting said water discharge means to a source of water,
   an elongated electrical moisture sensing means positioned on said inner side wall portion, said elongated electrical moisture sensing means having upper and lower ends with the upper end thereof being disposed above the lower end thereof, for sensing the presence of moisture thereon,
   means electrically connecting said sensing means to said electrical valve means for closing said electrical valve means when said sensing means senses the presence of moisture in contact therewith,
   a vertically disposed hollow feed supply tube positioned above said raised platform portion of said trough and having its lower end spaced therefrom to define a feed opening therebetween whereby feed in said feed supply tube will be deposited on said raised platform portion and will be accessible to an animal at said feed opening,
   means for selectively vertically moving said feed supply tube with respect to said raised platform portion to vary the size of said feed opening,
   said water discharge means being spaced from said moisture sensing means so that water being discharged from said water discharge means will not initially come into contact with said moisture sensing means but will accumulate in said trough until the water level in said trough reaches a predetermined level with respect to said moisture sensing means to cause said moisture sensing means to close said electrical valve means.

6. The feeder of claim 5 wherein the lower end of said feed supply tube is horizontally movable with respect to said raised platform portion.

7. The feeder of claim 5 wherein said sensing means comprises an elongated flat electrode plate mounted on said inner side wall portion of said trough.

8. The feeder of claim 7 wherein said flat electrode plate has its longitudinal axis disposed to the radial axis of said trough.

9. The feeder of claim 5 wherein a plurality of upstanding divider panels extend upwardly from said trough outwardly of said feed supply tube to divide the trough into individual animal eating positions.

10. The feeder of claim 9 wherein said panels are flat.

11. The feeder of claim 9 wherein said panels are operatively connected to said feed supply tube whereby contact of an animal with one of the panels will cause movement of the lower end of said feed supply tube to prevent bridging of feed in said feed opening and to cause the dispensing of feed through said feed opening.

12. The feeder of claim 5 wherein said moisture sensing means comprises at least two electrodes mounted on said inner side wall in a spaced apart relationship.

13. The feeder of claim 12 wherein at least two water discharge means are mounted on said inner side wall in a spaced apart relationship.

14. The feeder of claim 5 wherein said water discharge means comprises a nozzle which diverts water downwardly along said inner side wall portion.

15. An animal feeder comprising,
a circular trough having a circular, raised feed platform at its center, an inner side wall extending downwardly and outwardly from the periphery of said platform, an arcuate bottom wall at the lower end of said inner side wall, and an outer side wall extending upwardly from said arcuate bottom wall,
a water dispenser mounted on said inner side wall for dispensing water into said trough,
an electrically operated valve means connecting said water dispenser with a source of water,
an electrical switch including an electrode positioned on said inner side wall operatively connected to said valve means for closing said valve means when the water level in said trough reaches a predetermined level with respect to said electrode,
said switch also closing said valve means when a predetermined level of wet feed is in contact with said electrode,
a plurality of supports secured to said trough at the periphery thereof,
a plurality of upstanding panels, having inner and outer ends, secured at their lower outer ends to one of said supports and extending upwardly therefrom,
said panels defining eating spaces therebetween,
a first ring-shaped member secured to the inner ends of said panels above the lower ends thereof,
a second ring-shaped member secured to the inner ends of said panels adjacent the upper ends thereof,
a vertically disposed hollow feed supply tube positioned in said first and second ring shaped members and having its lower end spaced from said platform to define a feed opening therebetween whereby feed in said feed supply tube will be deposited onto said platform for access by an animal,
and vertical adjustable means interconnecting said feed supply tube and one of said first and second ring-shaped members for selective vertical movement of said feed supply tube relative to said platform to vary the size of said feed opening.

16. The feeder of claim 15 wherein the inside diameter of said first ring-shaped member is slightly larger than the outside diameter of said feed supply tube to permit a predetermined amount of movement of said feed supply tube with respect to said first ring-shaped member and said platform to prevent bridging of feed in said feed opening and to cause feed to be dispensed through said feed opening.

17. The feeder of claim 15 wherein said panels are secured to said ring-shaped members in such a manner whereby contact of an animal with one of said panels causes said feed supply tube to be moved relative to said platform to prevent bridging of feed in said feed opening and to cause feed to be dispensed through said feed opening.

18. The feeder of claim 15 wherein said switch is positioned above said arcuate bottom wall member so that water will normally be present in said arcuate bottom wall member.

19. A method of feeding animals comprising providing a continuously sloped surface having a top portion and a bottom portion, providing a trough at the bottom portion, one side of the trough being formed by the bottom portion of the sloped surface, depositing dry feed onto the sloped surface at the top portion, depositing water into the trough, maintaining a level of water in the trough such that it remains spaced from the top portion of the sloped surface, and arranging the sloped surface at an angle such that some of the dry feed can be caused to slide downwards to the trough to be wetted and some remains resting on the sloped surface above the water and thus remains dry, whereby the animal has access to water in the trough and on the sloped surface to both dry feed and wetted feed.

20. The method according to claim 19 wherein the trough is substantially V-shaped in cross-section converging substantially to an apex at the base of the trough.

21. The method according to claim 19 wherein the water is fed into the trough from a discharge nozzle mounted on the sloped surface at a position thereon below the top portion.

22. The method according to claim 19 wherein the angle of the sloped surface is less than the angle of repose of the feed material so that feed deposited on the top portion remains on the top portion until moved by the animal.

23. The method according to claim 19 including measuring the level of water on the sloped surface and dispensing further water into the trough only when the level falls below a predetermined level.

24. The method according to claim 23 wherein the level is measured by an electrode mounted on the sloped surface for communicating electrical current though the water.

25. The method according to claim 24 including providing a first electrode on the sloped surface and a second electrode on the sloped surface spaced longitudinally of the trough.

26. The method according to claim 25 wherein each of the electrodes comprises a metal band lying on the sloped surface and extending upwardly of the sloped surface.

27. A feeder for animal comprising a trough which is substantially circular in plan view surrounding a vertical central axis so as to define an outer rim surface defining an outer edge thereof for containing feed materials within the trough, the outer rim surface being arranged such that a number of the animals can stand around the trough at angularly spaced positions of the trough and reach over the rim surface to a feeding area within the trough to eat the feed materials from the trough, hopper means located above the trough for depositing feed into the trough and including a duct portion extending downwardly toward the trough, receiving surface means located beneath a lowermost edge of the duct portion and arranged relative to the lowermost edge so as to be spaced therefrom by a distance such that a repose angle of the feed material causes the feed material to remain on the receiving surface means between the receiving surface means and the lowermost edge to control supply of further feed material from the hopper means into the trough, means connecting the receiving surface means and the trough, a plurality of divided members mounted on the trough at angularly spaced positions therearound so as to divide the feeding area into a plurality of separate sections, and means connecting at least the duct portion of the hopper to the divided members, connection between the duct portion and the trough through the divider members being flexible to allow some movement between the duct portion and the trough and therefore between the duct portion and the receiving surface means to prevent bridging of feed material therebetween, said feeder including a plurality of support feet secured to the trough for engagement with a supporting surface, each of said divider members being connected to one of said support feet and extending upwardly therefrom.

28. The feeder according to claim 27 wherein the divider members each comprise a plate extending radially inwardly toward the central axis.

29. The feeder according to claim 27 including a ring member surrounding the duct portion, the ring member being connected to the divider members.

30. The feeder according to claim 29 including means for vertically adjusting the position of the duct portion within the ring member so as to adjust the distance between the receiving surface means and the lowermost edge.

31. The feeder according to claim 29 wherein each divider member includes an outer edge member connected at its lower end to the rim surface of the trough and extending upwardly and inwardly therefrom.

32. The feeder according to claim 31 including a support foot connected to the trough at the lower end of each edge member.

33. The feeder according to claim 27 wherein the trough includes an inner surface portion which is substantially frusto conical so as to be connected to the outer rim surface at a outermost edge of the inner surface portion so as to define in cross-section a V-shape between the rim surface and the inner surface portion, the receiving surface means being provided at a top portion of the frusto conical inner surface portion.

34. The feeder according to claim 27 including a water supply tube for supplying water into the trough, a detector mounted in the trough for detecting the level of water in the trough, a communication wire extending from the detector, a water supply valve for controlling water supply to the supply tube for feeding the water into the trough, the wire connector and the water supply tube being mounted within a fixed tube extending through the hopper, through the duct portion and through the receiving surface means.

35. A feeder for animals comprising a trough having a front surface adjacent to an animal feed position, a rear surface spaced from the animal feed position, a base between the front and rear surfaces, the front and rear surfaces each including at least a portion thereof adjacent the base which is inclined to the horizontal so as to define in cross section at the base a substantially V-shape of the trough with the portions converging substantially to an apex at the base between the portions, a hopper for containing feed, surface means located beneath the hopper onto which feed falls from the hopper, the surface means being arranged such that the animal at the animal feed position can reach the surface means to take the feed therefrom and such that feed caused by the animal to fall from the surface means falls into the trough, supply means for supplying water into the trough and means for detecting a level of the water in the trough and for actuating said supply means in response to a reduction in the level of water to maintain the level of water at a predetermined height within said substantially V-shape of the trough, said detecting means comprising at least one electrode mounted on one of said portions of the front and rear surfaces, said electrode being mounted on the inclined portion of said rear surface.

* * * * *